Patented Jan. 13, 1953

2,625,499

UNITED STATES PATENT OFFICE 2,625,499

SURFACED FABRIC AND METHOD OF MAKING SAME

Robert J. Nebesar, Bristol, Tenn., assignor to Universal Moulded Products Corporation, Bristol, Va., a corporation of Delaware Application November 22, 1949, Serial No. 128,784

2 Claims. (Cl. 154—121)

This invention relates to a surfaced fabric and comprises a resin-impregnated fabric having a surface consisting of a synthetic resin differing in nature from the impregnating resin in that the surface resin does not impregnate the fabric but is mechanically bonded to the fabric.

The importance of the problem involved here stems from the fact that while unique and highly desirable surface characteristics can be had by surfacing a fabric with certain resins which will not impregnate the fabric, the use of such a surfacing resin is disadvantageous since ready separation of the surfacing from the fabric results. Again, where such a non-impregnating surfacing resin has been used, the thus surfaced fabric has been unsuitable for many purposes due to its lack of strength as compared to an impregnated fabric.

The problem then, which has been solved by this invention, is to provide a woven fabric with a surface formed of a resin which not impregnate the fabric and yet which will be securely bonded to the fabric. Further, this invention solves the problem of providing such a surfaced fabric with strength characteristics comparable to a fully impregnated fabric sheet.

Figure 1:
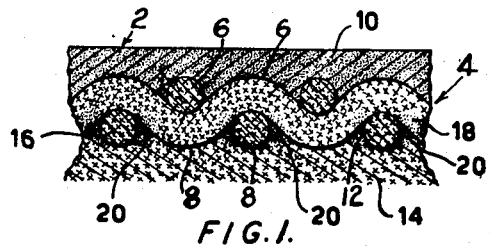
Figure 2:
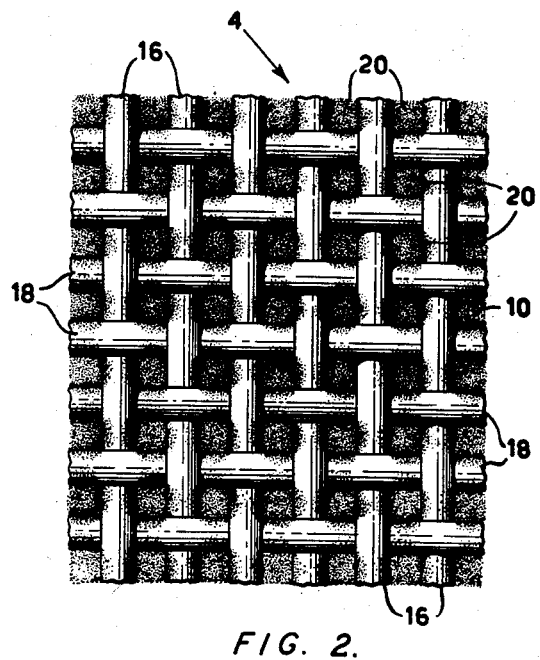

Figure 1 is an enlarged vertical section partly broken away of a fabric impregnated and surfaced in accordance with this invention, the section being taken adjacent a woof yarn; and Figure 2 is an enlarged bottom plan view of the fabric of Figure 1 after the surfacing resin has been applied and before the impregnating resin has been applied.

It will be understood that, where used in the specification and claims with respect to a woven fabric, the term "impregnate" means to penetrate between the individual filaments of the yarn as contrasted to simple penetration of the interstices formed between the yarns.

The fabric, in accordance with this invention, is a woven fabric formed of yarn having a plurality of filaments. For example, inert filaments, as for example glass fiber filaments may be used. Other woven fabrics may be utilized, as for example fabrics woven from nylon, orlon and other synthetics.

It will be understood that in the description and claims the term "yarn" includes a thread which is made up of a plurality of yarns.

Where the fabric is woven from a glass fiber yarn, it is usually desirable to chemically treat the fabric prior to use in order to improve its wetting properties and eliminate preparations such as lubricants adhered to the fibers to facilitate their weaving. This may be done, for example, by burning them off. Such treatments are well known in the art. The wetting properties of glass fibers are known to be improved, for example, by the use of a mixture of 1% of a methacrylic chrome complex which is marketed, for example, by the Grasselli Division of Du Pont as G-1050-M, 97.5% water and 1½% neutralizing solution comprising 5% sodium formate, 0.2% formic acid and 94.8 water.

The impregnating resin may be, for example, a synthetic thermosetting resin, for example, of the polyester type. As exemplary of the resins which may be used are a composition comprising a substantially linear polyhydric alcohol ester of an unsaturated polybasic acid material of the maleic type and a substituted ethylene body of resin forming characteristics which is copolymerizable and miscible with the polyhydric alcohol ester. Thus, for example, the composition may be diethylene glycol maleate or diethylene glycol fumarate having incorporated therewith vinyl acetate, amylacrylate, or vinyl chloride. The curing of such a maleic substituted ethylene composition will be accelerated by using a curing catalyst such as benzoyl peroxide, phthalyl peroxide or air-blown dioxane. Such thermosetting resins are well known in the art and reference may be made to Patent 2,255,313, issued September 9, 1941, to Carleton Ellis for further information relative to them.

Again, thermoplastic impregnating resins may also be used when desired. Thus, for example, dichloro-styrene and styrene are satisfactory.

It will, of course, be apparent that any thermoplastic or thermosetting impregnating resin may be used, the above examples being merely exemplary.

The surfacing resin may be, for example, a high molecular weight solid polymer of ethylene. The ethylene polymers disclosed in Patent 2,219,684, issued to Eric William Fawcette, October 29, 1940, are exemplary. High molecular weight monochlortrifluoroethylene

having, for example, a molecular weight of 25,000 may also be used. These surfacing resins are characterized by the fact that they will not impregnate yarn although they will penetrate between the interstices formed by the yarns. Further, they will not bond chemically with the conventionally used impregnating resins. However, all thermoplastic surfacing resins, characterized by the fact that they will not impregnate fabric yarns although they will penetrate between the interstices formed by the yarns, are included within the scope of the term "surfacing resin" as here used.

Referring to the figures, a sheet 2 has a woven fabric layer 4 which has an upper face 6 and a lower face 8. The surfacing resin 10 forms a protective surface over the upper face 6 of the fabric. The surfacing resin 10 extends downwardly into fabric 4 to a point indicated at 12, which is approximately midway between the upper and lower faces of the fabric.

An impregnating resin 14 forms a thin layer over the lower face 8 of the fabric. Impregnating resin 14 extends upwardly into the fabric to a point adjacent the upper face 6 of the fabric.

The surfacing resin 10, as heretofore discussed, will not impregnate fabric 4. However, when subjected to heat and pressure, it will penetrate the interstices between the yarns of the fabric. On the other hand, the impregnating resin, in a conventional manner, will penetrate the yarns and wet the individual filaments.

The surfacing resin 10 may be applied to the fabric 4 by placing a sheet of the desired surfacing resin on the upper face 6 of fabric 4 and then applying heat and pressure to the sheet of surfacing resin, for example, a sheet of monochlortrifluoroethylene at a pressure of 8 p. s. i. at a temperature of 420° F. to 440° F. will be satisfactory. The same pressure and temperatures of from 235° F. to 245° F. have been found to be generally satisfactory with the above discussed ethylene polymers, but it will be understood that a wide range of temperatures and pressures may be utilized, limited only by the requirement that they combine to result in the passage of the surfacing resin into the interstices between the fabric yarns. Preferably the heat and pressure will be continued until the surfacing resin has penetrated to a point approximately halfway through the fabric. The thus surfaced fabric is then cooled while still under pressure.

The impregnating resin will be applied in any one of the methods well known to the art and cured at a temperature depending upon the particular impregnating resin selected.

Figure 2 shows the relationship between the surfacing resin and the fabric in specific detail. As shown, the fabric 4 has warp yarns 16 and woof yarns 18. The surfacing resin 10, as it is forced downwardly into the interstices between the warp and woof yarns, flows outwardly around the warp and woof yarns, thus forming heads 20.

As heretofore mentioned, the penetration of the surfacing resin will preferably be about half way through the fabric. However, the penetration may, of course, vary so long as the heads are formed under some of the fabric yarns to form a mechanical bond and yet do not fully envelop the yarns to prevent their subsequent impregnation.

It should be carefully noted that these heads, in a manner analogous to a rivet, cannot be withdrawn through the respective interstices unless the warp and woof yarns are spread apart. Before the impregnating resin is applied, it will be apparent that the yarns may quite readily be separated, permitting the withdrawal of the heads 20.

As shown in Figures 1 and 2, after the impregnating resin has been applied to the fabric and cured, the heads 20 are securely held in place by mechanical action. As clearly indicated in Figure 1, the impregnating resin 14 passes upwardly into each fabric yarn where it is not covered by the surfacing resin 10 and impregnate the yarn. It will be further particulary noted that the impregnating resin 14 by impregnating all of the yarn structure which lies around and above the heads 20 and by forming a solid structure below and abutting against the heads effectually locks the heads in position.

The locking action achieved by resin 14 is graphically illustrated in Figure 1, which shows how a pair of adjacent heads 20 have been formed about the warp yarn 16. Yarn 16, being impregnated with resin 14, and thus formed into a strong member difficult to compress, it will be apparent that it will be extremely difficult to pull the heads 20 upwardly and free of yarn 16.

It will be appreciated that the impregnating resin 14, in addition to forming a lock about the heads 20 of the surfacing resin, performs additional functions. In the first place, the impregnating resin gives the surfaced fabric greatly increased strength.

Structures made of the material in accordance with this invention are extremely useful where good dielectric properties are requisite along with the strength and corrosion resistance properties. For example, the fabric laminate of the invention is useful in making the domes widely used for covering and protecting radar antennas. In this case, the protective surfacing resin is placed on the exterior surface of the dome and provides a highly superior weather and abrasion resisting structure. Further, such domes have the strength requisite for use on aircraft where they are most frequently employed.

As indicative of the advantages and practicability of using a material of this invention on aircraft radar domes, woven fiber glass fabric embodiments of this invention were subjected to a 250 M. P. H. wind tunnel rain erosion test run for 920 minutes. The surfacing resin showed considerable roughening but no erosion through the film. By way of contrast, an uncoated but impregnated fiber glass fabric will erode at this speed in from 45 to 60 minutes. Again, woven fiber glass embodiments of this invention were tested at 500 M. P. H and eroded through the surfacing resin in 65 minutets. This may be contrasted with an uncoated but impregnated fiber glass fabric which erodes through the fabric at this speed in 3 to 5 minutes.

The above illustrations are, of course, merely exemplary, and the scope of the invention should not be limited except as set forth in the following claims.

What is claimed is:

1. A new article of manufacture comprising a sheet composed of interwoven yarns of fabric having interstices between the yarns, a thermoplastic surfacing resin compound selected from the group consisting of high molecular weight ethylene polymers and high molecular weight monochlortrifluoroethylenes covering the face of the fabric and penetrating said interstices and gripping the yarns of the fabric without impregnating said yarns, and a fabric impregnating resin penetrating the yarns throughout the fabric as well as said interstices, whereby the yarns of the fabric are held from substantial relative lateral slippage and separation of the surfacing resin from the body of the fabric is resisted.

2. The method of manufacturing reinforced and surface-protected sheets comprising a base of interwoven yarns of fabric which comprises applying a film of a thermoplastic surfacing resin selected from the group consisting of high molecular weight ethylene polymers and high molecular weight monochlortrifluoroethylenes to one face of the fabric under heat and pressure adequate to cover the surface of the fabric and penetrate the interstices between, and also grip without impregnating, the fabric yarns and forcing into the other face of the fabric a resin adapted, besides penetrating the interstices between the fabric yarns, to penetrate the yarns throughout the fabric.

ROBERT J. NEBESAR.

REFERENCES CITED

The following references are of record in the file of this patent:

UNITED STATES PATENTS

| Number | Name | Date |
| --- | --- | --- |
| 1,455,744 | Diamond | May 15, 1923 |
| 1,953,901 | Ziegler | Apr. 3, 1934 |
| 2,100,712 | Emmey | Nov. 30, 1937 |
| 2,111,933 | King | Mar. 22, 1938 |
| 2,234,252 | Homan | Mar. 11, 1941 |
| 2,255,313 | Ellis | Sept. 7, 1941 |
| 2,332,373 | Dorough et al. | Oct. 19, 1943 |
| 2,390,190 | Soday | Dec. 4, 1945 |
| 2,420,974 | Petroske | May 20, 1947 |